June 5, 1928.
J. S. CURTISS
1,672,060
TIRE SPREADER AND TIRE IRON
Filed Nov. 14, 1927
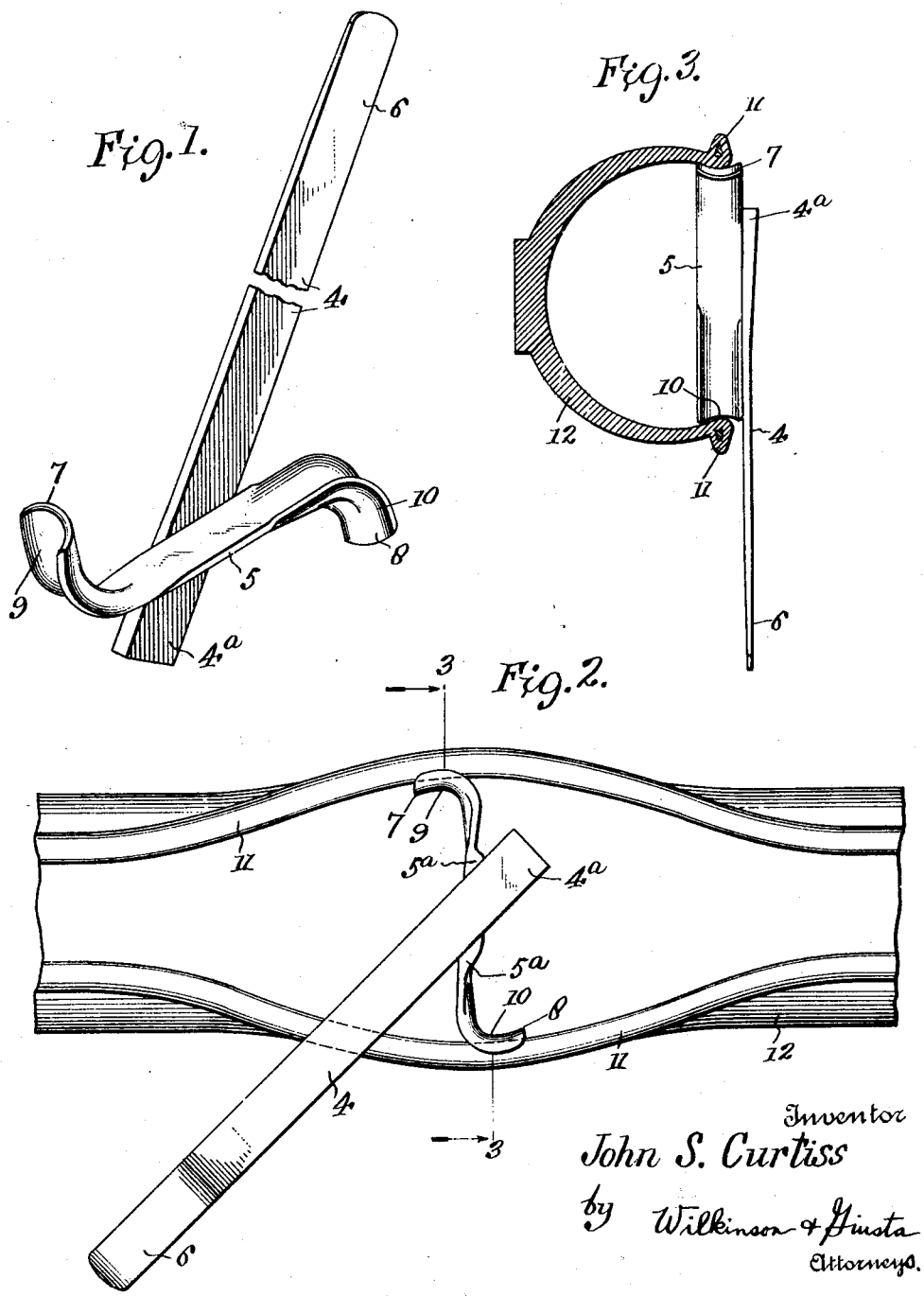
Inventor
John S. Curtiss
by Wilkinson & Fiusta
Attorneys.

Patented June 5, 1928.

1,672,060

UNITED STATES PATENT OFFICE.

JOHN S. CURTISS, OF EL PASO, TEXAS.

TIRE SPREADER AND TIRE IRON.

Application filed November 14, 1927. Serial No. 233,241.

The present invention relates to improvements in a tire spreader and tire iron, such as is shown in the application of Arthur E. Johnson, filed October 20, 1927, Serial No. 227,554 and entitled, Improvements in tire spreader and tire iron; and has for an object to provide an improved implement useful in spreading apart the beads of automobile tire casings for the purpose of giving access to the interior portions of the tread in the search for tacks, nails, thorns, and other sharp foreign bodies which cause puncture of inner tubes.

Another object of the invention is to provide a comparatively small portable implement capable of being carried in the vehicle, and acting not only to spread the tires as previously stated, but also useful as a tire iron for removing the tires from the rims.

With the forgoing and other objects in view, the invention will be more fully described hereinafter, and will be more particularly pointed out in the claims appended hereto.

In the drawings, wherein like symbols refer to like or corresponding parts throughout the several views.

Fig. 1 is a perspective view of the improved implement constructed according to the present invention;

Fig. 2 is a plan view of the improved implement and of a portion of a tire casing spread by the implement; and Fig. 3 is a cross-section through the tire casing taken on the line 3—3 in Fig. 2, the tool being shown in elevation.

Referring more particularly to the drawings, the improved implement consists generally of two parts, welded or otherwise secured together, that is of a handle 4 and a head piece 5. The handle 4 is tapered at its upper end 6 to conform to the shape of a tire iron, and at its lower end is thickened to resist the blows of a hammer.

The head 5 extends generally crosswise with respect to the handle 4, or in other words, the handle is arranged diagonally of the head for the purpose of projecting without the perimeter of the tire casing, as shown in Fig. 2. As a consequence, the handle 4 may be more readily grasped, and worked with better facility. Both the handle 4 and head 5 may be constructed of any appropriate material.

When the two parts are secured together as shown, the head piece 5, from an edgewise aspect, is at substantially 90° from the flatwise plane of the handle; while viewed from a lengthwise aspect of the head piece 5, the same occupies a diagonal position with respect to the handle, or the handle and head piece are at substantially 45° to one another.

The opposite ends 7 and 8 of the head piece 5 are turned or curved in opposite directions, and are bent or shaped transversely into troughs 9 and 10. These troughs are convex as to their longitudinal surfaces extending lengthwise of the head piece 5, and are concave transversely. This construction reinforces and strengthens the head piece at the terminals thereof, where the same engage the beads 11 of the tire casing or shoe shown at 12.

In the use of the device, the head piece 5 is inserted within the circle of the tire casing 12 and lengthwise in line with the opening between the beads 11. The end portions of the head piece are inserted between the beads 11, and the device turned clockwise, by manipulation of the handle 4, to the position shown in Fig. 2. The opposite beads of the tire are received in the opposite troughs 9 and 10 of the head piece 5, which now extends transversely of the casing or shoe, and has pushed the beads apart, so that access may be readily had to the inner portion of the tread of the tire for probing for nails and the like, the points of which are apt to puncture or injure the inner tube. The handle 4, on account of its relative position with the head piece 5, is not substantially in the way but leaves the spaces at opposite sides of the head piece open to the hand and implement of the explorer.

The implement is made to "walk about" within the tire by shifting the handle 4 back and forth and pushing or pulling the tool about in the tire. This operation may be conducted with one hand while the other hand is used to explore the inner surface of the tire tread. The implement will remain in the position shown in Fig. 2 without aid of the operator due to the inherent resiliency of the rubber tire pressing upon the transversely positioned head piece.

Prior to the exploration just referred to, it is essential that the tire casing be removed from the rim, and the handle 4 will be found useful for this purpose, the sharpened or beveled end 6 being inserted between the tire beads and rim after a manner well known in this art.

It is sometimes desirable to use a hammer in the operation of the device, as for removing the tire casing from the rim before inserting the tool in the casing, or for other purposes, and for this reason the blunt end 4$^a$ is provided opposite the tapered end 6 of the handle, which blunt end is thickened so as to be better able to withstand the blows of a hammer. This blunt end also serves as a convenient foot or support for the tool when stood on end.

It will be obvious that many changes in the construction, combination, and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. A tire implement comprising a head having reversely curved and troughed opposite ends adapted to receive and spread the beads of a tire casing, and a handle attached to said head, said handle having a thickened blunt lower end.

2. An improved tire implement comprising a head piece having reversely curved and troughed opposite end portions adapted to engage and spread the beads of a tire casing, and a handle for the head extending diagonally from said head, said handle having a thickened blunt lower end.

JOHN S. CURTISS.